United States Patent
Tamitsuji

(10) Patent No.: US 10,601,350 B2
(45) Date of Patent: Mar. 24, 2020

(54) MOTOR DEVICE, MOTOR DRIVING CONTROL DEVICE AND MOTOR DRIVING METHOD

(71) Applicant: MINEBEA MITSUMI Inc., Nagano (JP)

(72) Inventor: Toshihiro Tamitsuji, Iwata (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 16/239,930

(22) Filed: Jan. 4, 2019

(65) Prior Publication Data

US 2019/0238074 A1    Aug. 1, 2019

(30) Foreign Application Priority Data

Jan. 29, 2018  (JP) ................................ 2018-012735

(51) Int. Cl.
| | |
|---|---|
| H02P 6/16 | (2016.01) |
| H02K 11/215 | (2016.01) |
| H02K 3/20 | (2006.01) |
| H02K 1/14 | (2006.01) |
| H02P 1/46 | (2006.01) |

(52) U.S. Cl.
CPC ................. *H02P 6/16* (2013.01); *H02K 1/14* (2013.01); *H02K 3/20* (2013.01); *H02K 11/215* (2016.01); *H02P 1/465* (2013.01)

(58) Field of Classification Search
CPC ............................... H02P 6/16; H02K 11/215
USPC .................................................... 318/490, 34
See application file for complete search history.

(56) References Cited

U.S. PATENT DOCUMENTS 9,813,007 B2 * 11/2017 Burke ..................... H02P 25/22

FOREIGN PATENT DOCUMENTS

JP        2006-333585 A    12/2006

\* cited by examiner

*Primary Examiner* — David Luo
(74) *Attorney, Agent, or Firm* — Pearne & Gordon LLP

(57) ABSTRACT

A motor device includes a motor, a motor driving control device and a position detector for outputting a position detection signal. The motor includes magnetic poles (n*6) and coils wound around teeth (n*4) where n is a positive integer. The coils are arranged in a peripheral direction such that the first-system coils and the second-system coils are alternately arranged. The motor driving control device includes a first drive circuit and a second drive circuit, each including an inverter circuit and a control circuit portion. The first drive circuit energizes the first-system coils and the second drive circuit energizes the second-system coils at an energization timing different from that of the first-system coils.

9 Claims, 3 Drawing Sheets

MOTOR DEVICE, MOTOR DRIVING CONTROL DEVICE AND MOTOR DRIVING METHOD

CROSS REFERENCE TO RELATED APPLICATIONS

This application claims the benefit of Japanese Patent Application No. 2018-012735, filed Jan. 29, 2018, which is hereby incorporated by reference in its entirety.

BACKGROUND

Technical Field

The present disclosure relates to a motor device, a motor driving control device, and a motor driving method, and particularly relates to a motor device, a motor driving control device for controlling driving of a motor, and a method for driving a motor.

Background

With respect to single-phase motors, it is necessary to start driving of the single-phase motors while avoiding a problem wherein the single-phase motors fall into a so-called dead point. For such a problem, it has been generally practiced in the single-phase motors that the air gap between a magnet and teeth of a stator is biased so that the single-phase motors can be stably driven without causing any dead point (for example, see Japanese Patent Laid-Open No. 2006-333585).

Here, in the structure as described in Japanese Patent Laid-Open No. 2006-333585, a cogging torque increases because the air gap between the magnet and the teeth is biased, so vibration caused by rotation of the motor tends to occur.

The present disclosure relates to providing a motor device, a motor driving control device and a motor driving method that are capable of surely starting rotation of a motor and hardly making vibration of the motor occur.

SUMMARY

According to an aspect of the present disclosure, a motor device includes a motor, a motor driving control device for controlling driving of the motor, and a position detector for outputting a position detection signal according to a position of a rotor of the motor, wherein the motor includes magnetic poles and a plurality of coils respectively wound around a plurality of teeth, and a number of the magnetic poles is a number obtained by multiplying a positive integer n by 6, a number of combinations each including the tooth and the coil wound around the tooth is a number obtained by multiplying the positive integer n by 4, each of the plurality of coils is contained in first-system coils connected to each other in series or second-system coils connected to each other in series, the combinations each including the tooth and the coil wound around the tooth are arranged in a peripheral direction such that the first-system coils and the second-system coils are alternately arranged, the motor driving control device includes a first drive circuit and a second drive circuit, each of the first drive circuit and the second drive circuit includes an inverter circuit and a control circuit portion for controlling an operation of the inverter circuit based on the position detection signal, the inverter circuit of the first drive circuit energizes the first-system coils under control of the control circuit portion of the first drive circuit, and the inverter circuit of the second drive circuit energizes the second-system coils at an energization timing different from an energization timing of the first-system coils under control of the control circuit portion of the second drive circuit.

Preferably, the motor further includes auxiliary salient poles having the same number as the number of the plurality of teeth, no coil being wound around the auxiliary salient poles, and each of the auxiliary salient poles is arranged between two adjacent teeth of the plurality of teeth.

Preferably, each of the teeth has a tip end portion and a width of the tip end portion in a peripheral direction is equal to or smaller than an angle obtained by dividing 360° by the number of the magnetic poles.

Preferably, the number of the magnetic poles is 6, the number of combinations each including the tooth and the coil wound around the tooth is 4, and each of the teeth has a tip end portion and a width of the tip end portion in a peripheral direction is in a range between 50° and 60°.

Preferably, the position detector includes a first position detector arranged at a position corresponding to the first-system coils for outputting a position detection signal to the control circuit portion of the first drive circuit, and a second position detector arranged at a position corresponding to the second-system coils for outputting a position detection signal to the control circuit portion of the second drive circuit.

Preferably, the second position detector is located at a position rotated around a rotation axis of the motor with respect to the first position detector by an angle corresponding to an angle obtained by dividing 360° by a product of the number of magnetic poles and the number of systems.

Preferably, the first position detector is a first Hall element for outputting a first Hall signal as the position detection signal, the second position detector is a second Hall element for outputting a second Hall signal as the position detection signal, the control circuit portion of the first drive circuit switches a direction of the current flowing through the first-system coils at a timing corresponding to the input first Hall signal, and the control circuit portion of the second drive circuit switches a direction of the current flowing through the second-system coils at a timing corresponding to the input second Hall signal.

According to another aspect of the present disclosure, in a motor driving control device for controlling driving of a motor, the motor includes magnetic poles and a plurality of coils respectively wound around a plurality of teeth, and a number of the magnetic poles is a number obtained by multiplying a positive integer n by 6, a number of combinations each including the tooth and the coil wound around the tooth is a number obtained by multiplying the positive integer n by 4, each of the plurality of coils is contained in first-system coils connected to each other in series or second-system coils connected to each other in series, the combinations each including the tooth and the coil wound around the tooth are arranged in a peripheral direction such that the first-system coils and the second-system coils are alternately arranged, the motor driving control device includes a first drive circuit and a second drive circuit, each of the first drive circuit and the second drive circuit includes an inverter circuit and a control circuit portion for controlling an operation of the inverter circuit based on a position detection signal corresponding to a position of a rotor of the motor, the inverter circuit of the first drive circuit energizes the first-system coils under control of the control circuit portion of the first drive circuit, and the inverter circuit of the second drive circuit energizes the second-system coils at an energization timing different from an energization timing of the first-system coils under control of the control circuit portion of the second drive circuit.

According to a further aspect of the present disclosure, in a method for driving a motor by using a motor driving control device for controlling driving of the motor and a position detector for outputting a position detection signal according to a position of a rotor of the motor, the motor includes magnetic poles and a plurality of coils respectively wound around a plurality of teeth, and a number of the magnetic poles is a number obtained by multiplying a positive integer n by 6, a number of combinations each including the tooth and the coil wound around the tooth is a number obtained by multiplying the positive integer n by 4, each of the plurality of coils is contained in first-system coils connected to each other in series or second-system coils connected to each other in series, the combinations each including the tooth and the coil wound around the tooth are arranged in a peripheral direction such that the first-system coils and the second-system coils are alternately arranged, the motor driving control device includes a first drive circuit and a second drive circuit, and each of the first drive circuit and the second drive circuit includes an inverter circuit, and the method includes a first step of energizing the first-system coils by the inverter circuit of the first drive circuit based on the position detection signal, and a second step of energizing the second-system coils at an energization timing different from an energization timing of the first-system coils by the inverter circuit of the second drive circuit based on the position detection signal.

According to these disclosures, a motor device, a motor driving control device and a motor driving method that are capable of surely starting rotation of a motor and making vibration of the motor hardly occur can be provided.

DETAILED DESCRIPTION

A motor device according to an embodiment of the present disclosure will be described hereunder.

In the following description, the winding direction of a coil with respect to a tooth means a direction in which the coil is wound around the tooth when viewed from the tip end portion of the tooth to the rotation axis of the motor. That is, the coil is wound around the tooth in any one winding direction of a clockwise direction (CW direction) and a counterclockwise direction (CCW direction) with respect to the tooth.

Embodiment

Figure 1:
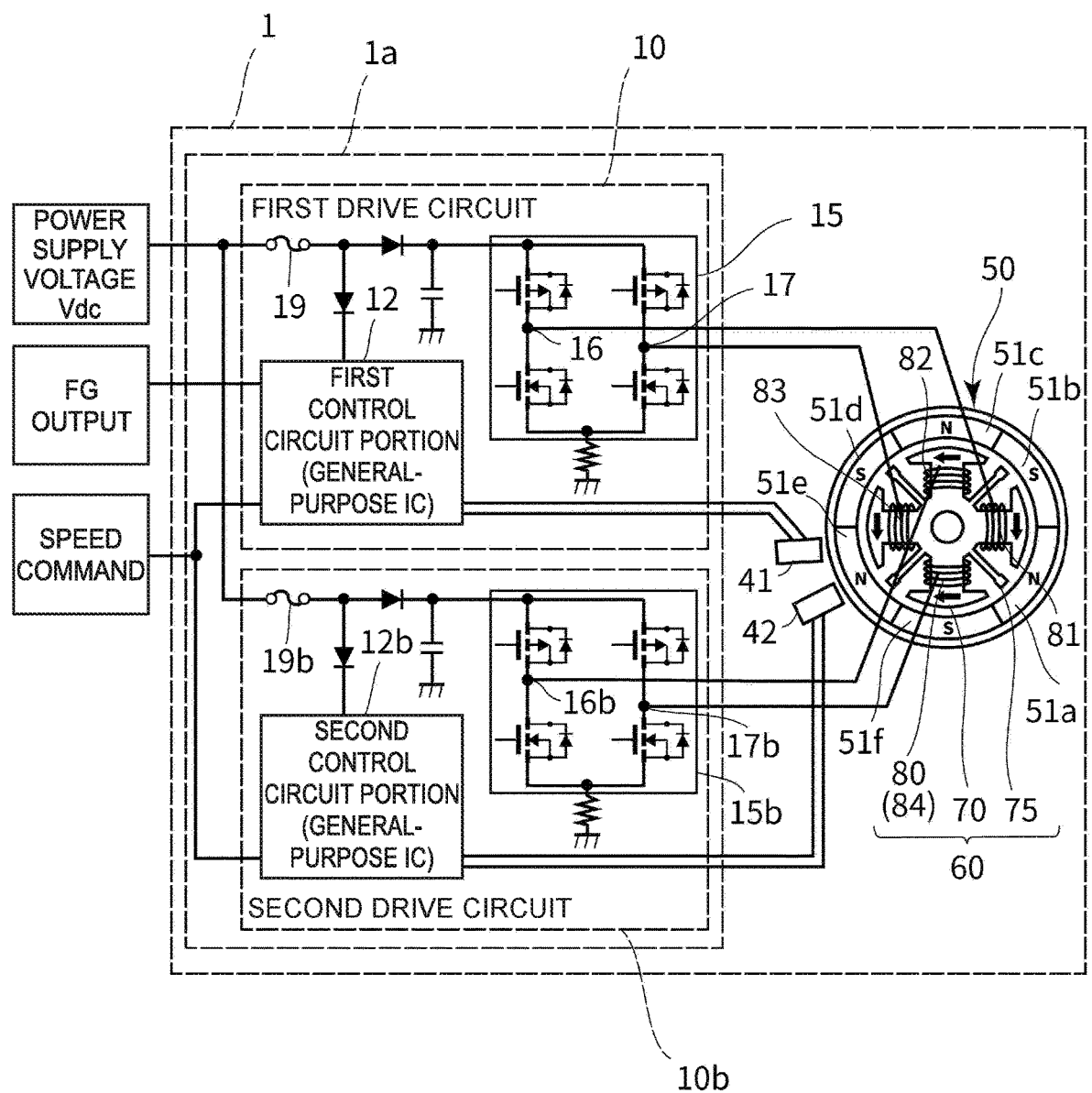
FIG. 1 is a schematic diagram showing a configuration of a motor device according to an embodiment of the present disclosure.

FIG. 1 is a schematic diagram showing a configuration of a motor device 1 according to an embodiment of the present disclosure.

As shown in FIG. 1, the motor device 1 includes a motor 50, a motor driving control device 1a for controlling driving of the motor 50, position detectors 41 and 42 (a first position detector 41 and a second position detector 42). The motor device 1 is supplied with a power supply voltage Vdc from the outside. An FG signal corresponding to rotation of the motor 50 is output from the motor device 1 to the outside. A speed command is input from the outside to the motor device 1. The motor device 1 drives the motor 50 according to the input speed command.

The motor 50 includes a plurality of magnetic poles 51 (51a, 51b, 51c, 51d, 51e, 51f) and a plurality of coils 80 (the reference numeral 80 collectively means each coil) respectively wound around a plurality of teeth 70 (the reference numeral 70 collectively means each tooth). In the present embodiment, the motor 50 has a plurality of auxiliary salient poles 75 (the reference numeral 75 collectively means each auxiliary salient pole) around which the coils 80 are not wound. A stator 60 is constituted by the plurality of teeth 70, the plurality of coils 80 and the plurality of auxiliary salient poles 75.

In the present embodiment, six magnetic poles 51a, 51b, 51c, 51d, 51e, 51f are provided. A combination of four pairs of the tooth 70 and the coil 80 wound around the tooth 70 is provided. In addition, four auxiliary salient poles 75 having the same number as four teeth 70 are provided. The six magnetic poles 51a, 51b, 51c, 51d, 51e, 51f are arranged such that N poles (the magnetic poles 51a, 51c, 51e) and S poles (the magnetic poles 51b, 51d, 51f) are arranged alternately in the peripheral direction.

In FIG. 1, the arrows represent the winding directions of the coils 80.

As described later, each of the plurality of coils 80 is contained in first-system coils 80a (shown in FIG. 2) connected to each other in series or second-system coils 80b (shown in FIG. 2) connected to each other in series.

In the present embodiment, the motor driving control device 1a includes a first drive circuit 10 and a second drive circuit 10b. The first drive circuit 10 and the second drive circuit 10b include inverter circuits 15, 15b and control circuit portions 12, 12b, respectively. Furthermore, the first drive circuit 10 and the second drive circuit 10b have fuses 19 and 19b, respectively.

Hereinafter, the control circuit portion 12 of the first drive circuit 10 may be referred to as a first control circuit portion 12 and the control circuit portion 12b of the second drive circuit 10b may be referred to as a second control circuit portion 12b. Also, the inverter circuit 15 of the first drive circuit 10 may be referred to as a first inverter circuit 15 and the inverter circuit 15b of the second drive circuit 10b may be referred to as a second inverter circuit 15b.

The power supply voltage Vdc and the speed command input to the motor device 1 are input to each of the first drive circuit 10 and the second drive circuit 10b. In the present embodiment, the FG signal is output from the first drive circuit 10 and output to the outside of the motor device 1.

The first position detector 41 is connected to the first drive circuit 10. The second position detector 42 is connected to the second drive circuit 10b.

The position detectors 41 and 42 output position detection signals according to the position of the rotor of the motor 50. As described later, the first position detector 41 outputs the position detection signal to the control circuit portion 12 of the first drive circuit 10. The second position detector 42 outputs the position detection signal to the control circuit portion 12b of the second drive circuit 10b.

In the present embodiment, the first and second position detectors 41 and 42 are the same Hall elements (first and second Hall elements). The first and second Hall elements output, as the position detection signals, Hall signals (first and second Hall signals) and each of the Hall signals has positive or negative polarity. Note that the first and second position detectors are not limited to the same elements, and are also not limited to Hall elements.

In the present embodiment, the first drive circuit 10 and the second drive circuit 10b have the same circuit configuration except that the FG signal is output from the first drive circuit 10. Therefore, the configuration of the first drive circuit 10 will be described below, and the following description is also applied to the second drive circuit 10b.

In the first drive circuit 10, the power supply voltage Vdc is input to the first control circuit portion 12 and the first inverter circuit 15 via a fuse 19.

The first control circuit portion 12 is, for example, a general-purpose IC for driving a motor. A speed command and a position detection signal output from the first position detector 41 are input to the first control circuit portion 12. The first control circuit portion 12 outputs an output signal for operating the first inverter circuit 15 based on the position detection signal, and controls the operation of the first inverter circuit 15. For example, the first control circuit portion 12 detects the rotational speed of the motor 50 based on the position detection signal, and controls on/off operations of switching elements included in the first inverter circuit 15 so that the rotational speed of the motor 50 becomes the rotational speed corresponding to the input speed command.

The first inverter circuit 15 energizes the coils 80 provided in the motor 50 based on the output signal output from the first control circuit portion 12. The first inverter circuit 15 has, for example, two pairs of series circuits each including two switching elements provided at both ends of the power supply voltage Vdc. In each pair of the two switching elements, the connection point between the switching elements serves as an output terminal 16 or 17 for energizing an energization system of the coils 80 (the first-system coils 80a or the second-system coils 80b) including the plurality of coils 80. A corresponding output signal is output from the first control circuit portion 12 to each of the switching elements of the inverter circuit 15, so that the switching element corresponding to each output signal performs the on/off operation, and the energization system of the coils 80 connected to the output terminals 16 and 17 is energized.

Hereinafter, in the first inverter circuit 15, the connection point of one pair of switching elements may be referred to as a first output terminal 16, and the connection point of the other pair of switching elements may be referred to as a second output terminal 17. In the second inverter circuit 15b, the connection point of one pair of switching elements may be referred to as a first output terminal 16b, and the connection point of the other pair of switching elements may be referred to as a second output terminal 17b.

In the first drive circuit 10, the first control circuit portion 12 outputs the FG signal according to the rotation of the motor 50. In this respect, in the second drive circuit 10b, the second control circuit portion 12b does not output the FG signal. Note that the FG signal may be output from the second control circuit portion 12b, and may not be output from the first control circuit portion 12.

Figure 2:
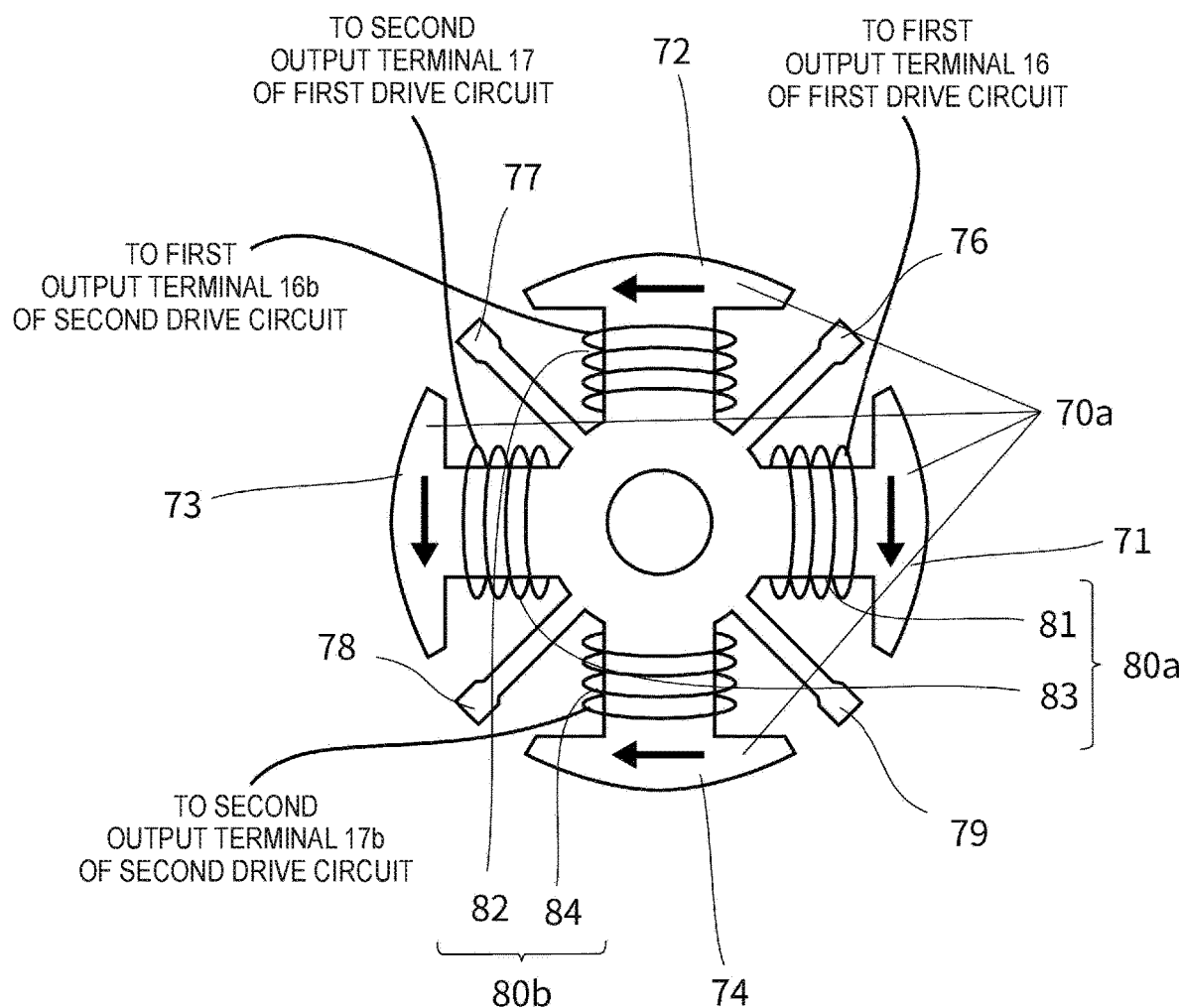
FIG. 2 is a diagram showing a configuration of a stator of a motor.
Figure 3:
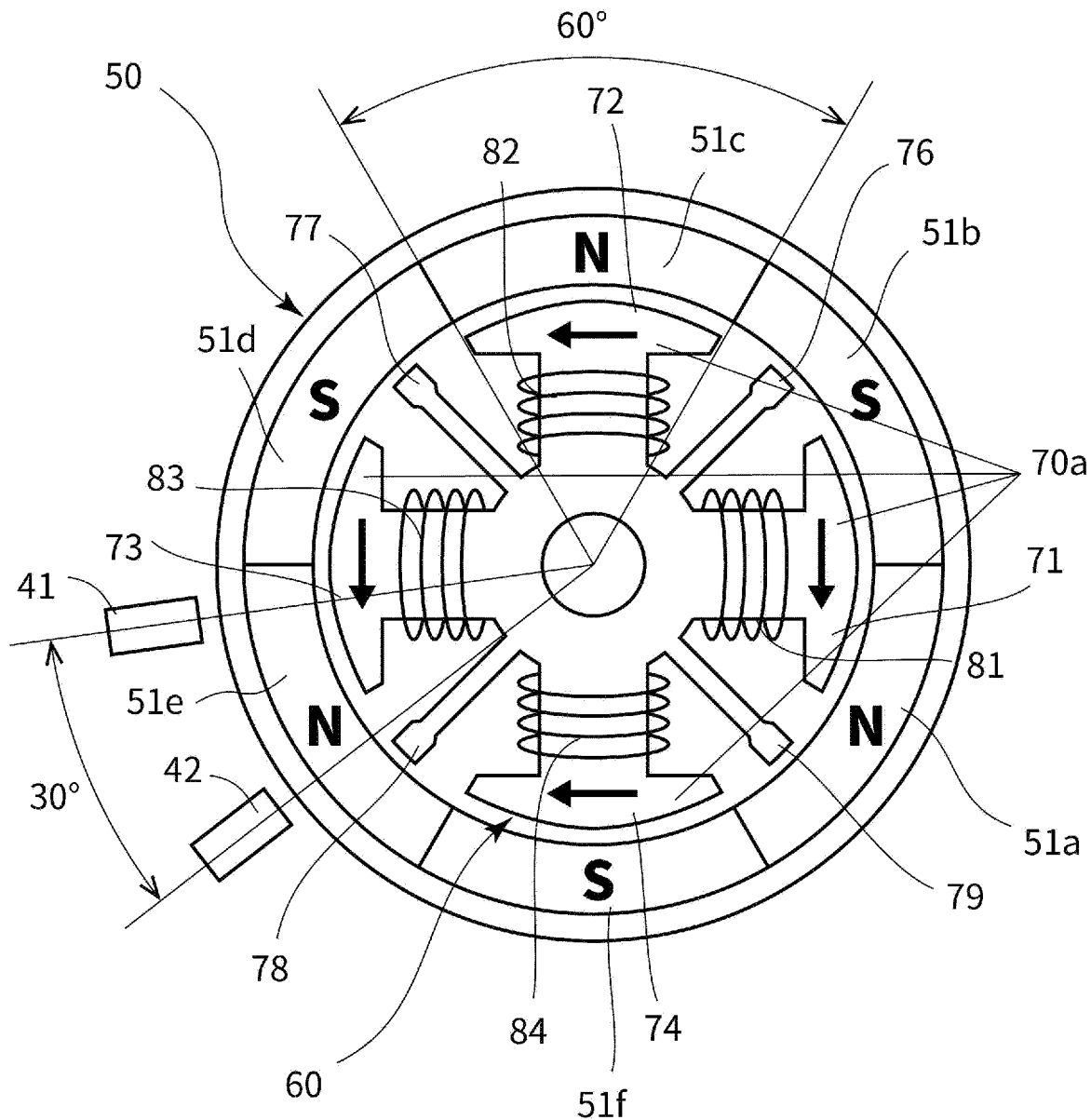
FIG. 3 is a schematic diagram showing the stator and magnetic poles of the motor.

FIG. 2 is a diagram showing a configuration of the stator 60 of the motor 50. FIG. 3 is a schematic diagram showing the stator 60 and the magnetic poles 51 of the motor 50.

In FIGS. 2 and 3, the arrows indicate the winding directions of the coils 80. In FIGS. 2 and 3, each coil 80 is schematically shown.

Each of the plurality of coils 80 (81, 82, 83, 84) is contained in the first-system coils 80a (81, 83) connected to each other in series or the second-system coils 80b (82, 84) connected to each other in series. The combinations each including the tooth 70 and the coil 80 wound around the tooth 70 are arranged in the peripheral direction such that the first-system coils 80a and the second-system coils 80b are alternately arranged.

Each of the teeth 70 (71, 72, 73, 74) and each of the auxiliary salient poles 75 (76, 77, 78, 79) are connected to each other at a location close to the rotation axis to constitute an integral stator yoke.

Each tooth 70 is configured so as to radially extend outward in the radial direction from a location close to the rotation axis so that the tip end portion 70a in the radial direction of the tooth 70 is in proximity to the magnetic pole 51 of the rotor. The teeth 70 are arranged at equal intervals in the peripheral direction, that is, at intervals of 90° around the rotation axis.

Similarly to the teeth 70, each auxiliary salient pole 75 is configured so as to radially extend outward in the radial direction from a location close to the rotation axis so that the tip end portion in the radial direction of the auxiliary salient pole 75 is in proximity to the magnetic pole 51 of the rotor. The auxiliary salient poles 75 are arranged at equal intervals in the peripheral direction, that is, at intervals of 90° around the rotation axis. The width dimension of each of the auxiliary salient poles 75 is smaller than the width dimension of each of the teeth 70 when viewed from the rotation axis direction. As a result, a space in which the coil 80 is wound around each tooth 70 is secured.

Each of the four auxiliary salient poles 76, 77, 78, and 79 is arranged between the two adjacent teeth 70. That is, the auxiliary salient pole 76 is arranged between the tooth 71 and the tooth 72, the auxiliary salient pole 77 is arranged between the tooth 72 and the tooth 73, the auxiliary salient pole 78 is arranged between the tooth 73 and the tooth 74, and the auxiliary salient pole 79 is arranged between the tooth 74 and the tooth 71. The respective auxiliary salient poles 75 and the respective teeth 70 are alternately arranged at equal intervals in the peripheral direction, that is, at intervals of 45° around the rotation axis.

In the present embodiment, each of the first-system coils 80a has a winding direction with respect to the teeth 70 different from that of the other first-system coil 80a adjacent in the peripheral direction and each of the second-system coils 80b has a winding direction with respect to the teeth 70 different from that of the other second-system coil 80b adjacent in the peripheral direction.

Specifically, as shown in FIG. 2, in the present embodiment, a total of four coils 81, 82, 83, and 84 are wound around the four teeth 71, 72, 73, and 74, respectively.

The first-system coils 80a and the second-system coils 80b are provided with the same number. That is, the number of the first-system coils 80a and the number of the second-system coils 80b are two, respectively.

The first-system coils 80a contains two coils 81 and 83 facing each other with the rotation axis being interposed between the coils 81 and 83. The coils 81 and 83 are wound around the teeth 71 and 73 in series so that one of the coils 81 and 83 starts winding and the other coil terminates winding.

The second-system coils 80b contains two coils 82 and 84 facing each other with the rotation axis being interposed between the coils 82 and 84. The coils 82 and 84 are wound around the teeth 72 and 74 in series so that one of the coils 82 and 84 starts winding and the other coil terminates winding.

As described below, the coils 80 are arranged in the peripheral direction so that the first-system coils 80a and the second-system coils 80b are alternately arranged. That is, the first-system coil 81, the second-system coil 82, the first-system coil 83 and the second-system coil 84 are arranged counterclockwise in FIG. 2.

The first-system coil 81 and the second-system coil 84 have the same winding direction with respect to the teeth 71 and 74 (here, this winding direction is referred to as the "CCW direction"). The first-system coil 83 and the second-system coil 82 have the same winding direction with respect to the teeth 73 and 72, but have an opposite direction to the winding direction of the coils 81 and 84 (here, this winding direction is referred to as the "CW direction").

The first inverter circuit 15 energizes the first-system coils 80*a* under the control of the first control circuit portion 12. The second inverter circuit 15*b* energizes the second-system coils 80*b* under the control of the second control circuit portion 12*b*.

The first inverter circuit 15 is connected to the first-system coils 80*a*. The first output terminal 16 is connected to the coil 81 and the second output terminal 17 is connected to the coil 83. In addition, the second inverter circuit 15*b* is connected to the second-system coils 80*b*. The first output terminal 16*b* is connected to the coil 82 and the second output terminal 17*b* is connected to the coil 84.

The first control circuit portion 12 switches the direction of the current flowing through the first-system coils 80*a* at a timing corresponding to an input position detection signal (first Hall signal), and the second control circuit portion 12*b* switches the direction of the current flowing through the second-system coils 80*b* at a timing corresponding to an input position detection signal (second Hall signal).

Here, the first position detector 41 is arranged at a position corresponding to the first-system coils 80*a*. The second position detector 42 is arranged at a position rotated around the rotation axis of the motor 50 with respect to the position of the first position detector 41 by an angle corresponding to an angle obtained by dividing 360° by the product of the number of magnetic poles 51 and the number of the systems.

As shown in FIG. 3, in the present embodiment, the first position detector 41 and the second position detector 42 are arranged to be angularly spaced from each other by 30° (an example of the angle corresponding to the angle obtained by dividing 360° by the product of the number of the magnetic poles 51 and the number of the systems) around the rotation axis of the motor 50. This angle (a 30° mechanical angle) is an angle corresponding to 90° in terms of electrical angle, and can be obtained by the following equation.

$$360°/(6\ poles \times 2(\text{the number of systems})) = 30°$$

The first position detector 41 and the second position detector 42 may be arranged to be angularly spaced from each other around the rotation axis of the motor 50 by an angle obtained by adding the angle (30°) determinable as described above with a multiple of an angle obtained by dividing 360° by a half of the number of magnetic poles, that is, by an angle of 30°+120 m (m represents a positive integer) degrees (an example of the angle corresponding to the angle obtained by dividing 360° by the number of the magnetic poles 51). When the connection positions of the first output terminal 16 and the second output terminal 17 of the first inverter circuit 15 to both the ends of the coil 80 are replaced by each other, or the connection position of the first output terminal 16*b* and the second output terminal 17*b* of the second inverter circuit 15*b* to both the ends of the coil 80 are replaced by each other, the first position detector 41 and the second position detector 42 may be arranged to be angularly spaced from each other by an angle of 30°+60°+120 m (m represents an integer of 0 or more) degrees.

Furthermore, even when the connection of the first position detector 41 to the first control circuit portion 12 and the connection of the second position detector 42 to the second control circuit portion 12*b* are replaced by each other, the first position detector 41 and the second position detector 42 may be arranged to be angularly spaced from each other by an angle of 30°+60°+120 m (m represents an integer of 0 or more) degrees.

Since the two position detectors 41 and 42 are arranged as described above, the energization timing of the first-system coils 80*a* and the energization timing of the second-system coils 80*b* differ from each other when the first drive circuit 10 and the second drive circuit 10*b*, which have a similar configuration, perform the energization operation of the coils 80 according to the position detection signals respectively input to the first drive circuit 10 and the second drive circuit 10*b*.

That is, the first inverter circuit 15 of the first drive circuit 10 energizes the first-system coils 80*a* under the control of the first control circuit portion 12 of the first drive circuit 10. Based on the position detection signal, the first control circuit portion 12 causes the first inverter circuit 15 to energize the first-system coils 80*a* (first step). Under the control of the second control circuit portion 12*b* of the second drive circuit 10*b*, the second inverter circuit 15*b* of the second drive circuit 10*b* energizes the second-system coils 80*b* at an energization timing different from the energization timing of the first-system coils 80*a*. Based on the position detection signal, the second control circuit portion 12*b* causes the second inverter circuit 15*b* to energize the second-system coils 80*b* at an energization timing different from the energization timing of the first-system coils 80*a* (second step). According to the rotational position of the rotor, the current flows through each of the first-system coils 80*a* and the second-system coils 80*b* so that a rotational torque is generated in the motor 50 and the motor 50 rotates.

In the present embodiment, the width in the peripheral direction of the tip end portion 70*a* of each tooth 70 is equal to or smaller than an angle obtained by dividing 360° by the number of magnetic poles 51. More specifically, when the number of magnetic poles 51 is 6, it is preferable that the width in the peripheral direction of the tip end portion 70*a* be in the range between 50° and 60°. That is, in the present embodiment, the width in the peripheral direction of each magnetic pole 51 is equal to 60°. It is preferable that the width in the peripheral direction of the tip end portion 70*a* is substantially equal to the width in the peripheral direction of each magnetic pole 51.

When the width of the tip end portion 70*a* is larger than the width in the peripheral direction of each magnetic pole 51, reaction force hindering the rotation of the motor 50 increases between the magnetic poles 51 and the teeth 70, so that the efficiency deteriorates. When the width of the tip end portion 70*a* is excessively smaller than the width in the peripheral direction of each magnetic pole 51, the coil 80 wound around the tooth 70 becomes wider than the tip end portion 70*a*, or the magnetic poles 51 cannot be effectively used, so that the efficiency deteriorates. By suitably setting the width in the peripheral direction of the tip end portion 70*a* within the range described above, it is possible to ensure the winding width of the coil 80 while preventing occurrence of the reaction force, and the efficiency under the operation of the motor 50 can be enhanced.

As described above, in the present embodiment, the motor device 1 has the following effects.

Normally, a relatively small single-phase motor is often configured to have 4 poles and 4 slots. On the other hand, in the present embodiment, the motor 50 having the configuration of 6 poles and 4 slots is driven by energizing each pair of two slots with each of the drive circuits 10 and 10b of two systems while the respective pairs of two slots are shifted from each other in phase (by a 90° electrical angle). Since the rotor stops at a position avoiding the dead point in each system, the dead point can be eliminated in each system. It is unnecessary to make the air gap between the magnetic poles and the teeth uneven so that the cogging torque can be reduced and occurrence of vibrations and noises can be suppressed. Furthermore, the motor 50 can be stably driven.

Drive circuits having the same circuit configuration and performing the same operation based on the position detection signals from the position detectors 41 and 42 can be used as the first drive circuit 10 and the second drive circuit 10b. Accordingly, the motor device 1 for energizing the coils 80a and 80b of the two systems can be simply configured. The motor device 1 can be driven with excellent efficiency by energizing the respective coils 80a and 80b of the two systems at appropriate timings.

The auxiliary salient poles 75 are provided in the stator 60 of the motor 50. Since the tip end portions of the auxiliary salient poles 75 are close to the magnetic poles 51 similarly to the tip end portions 70a of the teeth 70, a magnetic flux flows through the auxiliary salient poles 75. That is, it can be said that the motor 50 has a 6-pole and 8-slot structure. The provision of the auxiliary salient poles 75 makes it possible to drive the motor 50 with high efficiency. Furthermore, the provision of the auxiliary salient poles 75 also makes it possible to reduce the interval between the slots (the interval between the tooth 70 and the auxiliary salient pole 75), so that the cogging torque can be reduced.

In the present embodiment, even when the driving in one of the first drive circuit 10 and the second drive circuit 10b is stopped because a fuse 19 or 19b blows or fails, driving of the motor 50 can be continued by using the other of the first drive circuit 10 and the second drive circuit 10b. Therefore, for example, even when one of the drive circuits 10 and 10b stops under a state where an external load is applied to the motor 50, the motor 50 can continue to endure the external load because the rotational torque of the motor 50 can be generated. A stronger torque can be generated as compared with a case in which a short brake is applied to the motor 50. Since the rotor stops at a position avoiding the dead point with respect to both the systems under a state where rotation of the motor 50 stops, it is possible to generate the rotational torque of the motor 50 by using only one of the drive circuits 10 and 10b.

For example, in a case where the motor device 1 is used as one of a plurality of fan motors used to ventilate the inside of a device, even when one of the drive circuits 10 and 10b stops, the motor device 1 can endure the pressure difference between the inside and the outside of the device. Therefore, it is possible to prevent occurrence of a problem whereby the motor 50 rotates in reverse due to the pressure difference between the inside and the outside of the device and the ventilation ability deteriorates.

In the foregoing embodiment, either one of the first control circuit portion 12 of the first drive circuit 10 and the second control circuit portion 12b of the second drive circuit 10b may perform energization at a timing shifted from an energization timing based on an input position detection signal by a predetermined time (a timing shifted by 90° in electrical angle). In this case, the position detection signal output from one position detector can be shared by the two drive circuits 10 and 10b, and the number of position detectors can be reduced.

Others

The circuit configuration of the motor device is not limited to specific examples as shown in the foregoing embodiment and variants of the embodiment. The circuit configuration of the motor device may be configured so as to meet the purpose of the present disclosure by appropriately combining with configurations obtained by partially modifying individual configurations in the foregoing embodiment and the variants of the embodiment. Furthermore, various circuit configurations can be applied so as to meet the purpose of the present disclosure.

The motor used in the motor device of the present embodiment is not limited to that of the foregoing embodiment. The auxiliary salient pole may not be provided.

Furthermore, the number of magnetic poles and the number of slots are not limited to those of the examples. The number of magnetic poles and the number of slots may be set as follows. That is, the motor may be configured so as to have magnetic poles whose number is a number obtained by multiplying a positive integer n by 6 so that the number of combinations each including a tooth and a coil wound around the tooth is a number obtained by multiplying the positive integer n by 4. Furthermore, when the auxiliary salient poles are provided, the number of the auxiliary salient poles may be equal to the number of teeth. For example, a 12-pole and 16-slot motor (when the positive integer n is equal to 2) including the auxiliary salient poles may be used.

It is desirable that the number of turns of each first-system coil and the number of turns of each second-system coil are equal to each other, but may be different from each other. When the number of turns of each first-system coil and the number of turns of each second-system coil are equal to each other, this is more preferable because the magnitude of the current flowing in the first drive circuit and the magnitude of the current flowing in the second drive circuit can be balanced with each other.

The control circuit portion of each drive circuit portion is not limited to a general-purpose IC.

The number of position detectors is not limited to two, and more position detectors may be used.

Note that the foregoing embodiment is illustrative in all respects, and not limited. The scope of the present disclosure is defined not by the above description, but by the claims, and it is intended to contain all modifications within the meanings and scopes equivalent to the claims.

What is claimed is:

1. A motor device comprising:
   a motor;
   a motor driving control device for controlling driving of the motor; and
   a position detector for outputting a position detection signal according to a position of a rotor of the motor, wherein
   the motor includes magnetic poles and a plurality of coils respectively wound around a plurality of teeth, and a number of the magnetic poles is a number obtained by multiplying a positive integer n by 6,
   a number of combinations each including the tooth and the coil wound around the tooth is a number obtained by multiplying the positive integer n by 4,
   each of the plurality of coils is contained in first-system coils connected to each other in series or second-system coils connected to each other in series,
   the combinations each including the tooth and the coil wound around the tooth are arranged in a peripheral direction such that the first-system coils and the second-system coils are alternately arranged,
the motor driving control device includes a first drive circuit and a second drive circuit,
each of the first drive circuit and the second drive circuit includes an inverter circuit and a control circuit portion for controlling an operation of the inverter circuit based on the position detection signal,
the inverter circuit of the first drive circuit energizes the first-system coils under control of the control circuit portion of the first drive circuit, and
the inverter circuit of the second drive circuit energizes the second-system coils at an energization timing different from an energization timing of the first-system coils under control of the control circuit portion of the second drive circuit.

2. The motor device according to claim 1, wherein the motor further includes auxiliary salient poles having the same number as the number of the plurality of teeth, no coil being wound around the auxiliary salient poles, and each of the auxiliary salient poles is arranged between two adjacent teeth of the plurality of teeth.

3. The motor device according to claim 1, wherein each of the teeth has a tip end portion and a width of the tip end portion in a peripheral direction is equal to or smaller than an angle obtained by dividing 360° by the number of the magnetic poles.

4. The motor device according to claim 1, wherein the number of the magnetic poles is 6,
the number of combinations each including the tooth and the coil wound around the tooth is 4, and
each of the teeth has a tip end portion and a width of the tip end portion in a peripheral direction is in a range between 50° and 60°.

5. The motor device according to claim 1, wherein the position detector includes a first position detector arranged at a position corresponding to the first-system coils for outputting a position detection signal to the control circuit portion of the first drive circuit, and a second position detector arranged at a position corresponding to the second-system coils for outputting a position detection signal to the control circuit portion of the second drive circuit.

6. The motor device according to claim 5, wherein the second position detector is located at a position rotated around a rotation axis of the motor with respect to the first position detector by an angle corresponding to an angle obtained by dividing 360° by a product of the number of magnetic poles and the number of systems.

7. The motor device according to claim 5, wherein the first position detector is a first Hall element for outputting a first Hall signal as the position detection signal,
the second position detector is a second Hall element for outputting a second Hall signal as the position detection signal,
the control circuit portion of the first drive circuit switches a direction of a current flowing through the first-system coils at a timing corresponding to the input first Hall signal, and
the control circuit portion of the second drive circuit switches a direction of the current flowing through the second-system coils at a timing corresponding to the input second Hall signal.

8. A motor driving control device for controlling driving of a motor, wherein
the motor includes magnetic poles and a plurality of coils respectively wound around a plurality of teeth, and a number of the magnetic poles is a number obtained by multiplying a positive integer n by 6;
a number of combinations each including the tooth and the coil wound around the tooth is a number obtained by multiplying the positive integer n by 4;
each of the plurality of coils is contained in first-system coils connected to each other in series or second-system coils connected to each other in series;
the combinations each including the tooth and the coil wound around the tooth are arranged in a peripheral direction such that the first-system coils and the second-system coils are alternately arranged;
the motor driving control device includes a first drive circuit and a second drive circuit;
each of the first drive circuit and the second drive circuit includes an inverter circuit and a control circuit portion for controlling an operation of the inverter circuit based on a position detection signal corresponding to a position of a rotor of the motor;
the inverter circuit of the first drive circuit energizes the first-system coils under control of the control circuit portion of the first drive circuit; and
the inverter circuit of the second drive circuit energizes the second-system coils at an energization timing different from an energization timing of the first-system coils under control of the control circuit portion of the second drive circuit.

9. A method for driving a motor by using a motor driving control device for controlling driving of the motor and a position detector for outputting a position detection signal according to a position of a rotor of the motor, wherein
the motor includes magnetic poles and a plurality of coils respectively wound around a plurality of teeth, and a number of the magnetic poles is a number obtained by multiplying a positive integer n by 6;
a number of combinations each including the tooth and the coil wound around the tooth is a number obtained by multiplying the positive integer n by 4;
each of the plurality of coils is contained in first-system coils connected to each other in series or second-system coils connected to each other in series;
the combinations each including the tooth and the coil wound around the tooth are arranged in a peripheral direction such that the first-system coils and the second-system coils are alternately arranged;
the motor driving control device includes a first drive circuit and a second drive circuit; and
each of the first drive circuit and the second drive circuit includes an inverter circuit, wherein
the method comprises:
a first step of energizing the first-system coils by the inverter circuit of the first drive circuit based on the position detection signal; and
a second step of energizing the second-system coils at an energization timing different from an energization timing of the first-system coils by the inverter circuit of the second drive circuit based on the position detection signal.

* * * * *